United States Patent
Woo et al.

(10) Patent No.: US 11,794,333 B2
(45) Date of Patent: Oct. 24, 2023

(54) JOINT STRUCTURE FOR ROBOT AND ROBOT INCLUDING SAME

(71) Applicants: Hyundai Motor Company, Seoul (KR); Kia Corporation, Seoul (KR)

(72) Inventors: Seung Jun Woo, Uiwang-si (KR); Byung Ho Yoon, Uiwang-si (KR); Ki Hoon Nam, Gwangmyeong-si (KR); Byeong Cheol Lee, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 81 days.

(21) Appl. No.: 17/484,268

(22) Filed: Sep. 24, 2021

(65) Prior Publication Data

US 2022/0111511 A1    Apr. 14, 2022

(30) Foreign Application Priority Data

Oct. 12, 2020   (KR) ......................... 10-2020-0131447

(51) Int. Cl.
*B25J 9/00*  (2006.01)
*B25J 17/02* (2006.01)
*B25J 9/10*  (2006.01)
*B25J 9/12*  (2006.01)

(52) U.S. Cl.
CPC ........... *B25J 9/0048* (2013.01); *B25J 9/0045* (2013.01); *B25J 9/106* (2013.01); *B25J 9/126* (2013.01); *B25J 17/02* (2013.01); *B25J 17/0216* (2013.01); *B25J 17/0266* (2013.01); *B25J 9/12* (2013.01)

(58) Field of Classification Search
CPC ...... B25J 9/0045; B25J 9/0048; B25J 9/0051; B25J 9/0072; B25J 9/106; B25J 9/126; B25J 17/02; B25J 17/0216; B25J 17/0266; B25J 17/0283
See application file for complete search history.

(56) References Cited

U.S. PATENT DOCUMENTS

| 4,300,362 A * | 11/1981 | Lande ................. B25J 17/0266 464/147 |
| 6,330,837 B1 * | 12/2001 | Charles ................ B25J 17/0266 901/29 |
| 9,752,718 B1 * | 9/2017 | Wittig ................ F16M 11/2042 |

(Continued)

FOREIGN PATENT DOCUMENTS

| CN | 103042535 B | 1/2015 |
| CN | 111660280 A | 9/2020 |

(Continued)

*Primary Examiner* — Joseph Brown
(74) *Attorney, Agent, or Firm* — Slater Matsil, LLP

(57) ABSTRACT

An embodiment joint structure for a robot includes an upper plate provided in an upper region, a link part coupled to a lower surface of the upper plate, wherein the link part includes a first link and a second link, and wherein the first link and the second link are provided close to one side of the upper plate with respect to a center of the lower surface of the upper plate, a support part coupled to the lower surface of the upper plate and configured to support the upper plate, wherein the support part is provided to be closer to the center of the lower surface of the upper plate than is the link part, and a motor part configured to provide power to the support part and the link part.

13 Claims, 8 Drawing Sheets

(56) References Cited

U.S. PATENT DOCUMENTS

| | | | | |
|---|---|---|---|---|
| 2015/0040711 A1* | 2/2015 | Kim | ............................ | B25J 7/00 |
| | | | | 74/490.01 |
| 2021/0199183 A1* | 7/2021 | Huang | ...................... | B25J 17/00 |
| 2021/0331323 A1* | 10/2021 | Ding | ....................... | B25J 9/1697 |
| 2022/0166288 A1* | 5/2022 | Nose | ........................ | F16H 21/46 |

FOREIGN PATENT DOCUMENTS

| | | | | |
|---|---|---|---|---|
| DE | 19840886 A1 * | 3/2000 | ............ | B23Q 1/5462 |
| DE | 102011105383 A1 * | 12/2012 | ............. | B25J 19/063 |
| WO | WO-2018065734 A1 * | 4/2018 | ............. | B25J 9/0039 |

* cited by examiner

JOINT STRUCTURE FOR ROBOT AND ROBOT INCLUDING SAME

CROSS-REFERENCE TO RELATED APPLICATIONS

This application claims the benefit of Korean Patent Application No. 10-2020-0131447, filed in the Korean Intellectual Property Office on Oct. 12, 2020, which application is hereby incorporated herein by reference.

TECHNICAL FIELD

The present disclosure relates to a joint structure for a robot and a robot including the structure.

BACKGROUND

A joint mounted on a robot needs to have three degrees of freedom depending on the use of the robot. For example, in a case in which the robot has a neck joint when an x-axis and a y-axis are provided in a horizontal direction and a z-axis is provided in a vertical direction, the neck joint needs to be rotatable about the x-axis, the y-axis, and the z-axis.

In order to implement the joint of the robot having the three degrees of freedom, it is possible to consider a case in which three different motors are mounted to provide rotational force about the x-axis, the y-axis, and the z-axis. However, in the related art, because it is difficult to mount the three motors due to a narrow space around the joint of the robot, a joint having three degrees of freedom is implemented by mounting small-sized motors that produce low outputs. This causes deterioration in performance of the joint of the robot, resulting in limitation of tasks that can be performed by the robot.

SUMMARY

An embodiment of the present disclosure implements a new type of joint structure for a robot that has three degrees of freedom even though being mounted with motors that produce high outputs, thereby improving performance of a joint of a robot.

One embodiment of the present disclosure provides a joint structure for a robot, the joint structure including an upper plate provided in an upper region, a support part coupled to a lower surface of the upper plate and configured to support the upper plate, a link part coupled to the lower surface of the upper plate, and a motor part configured to provide power to the support part and the link part, in which the link part comprises a first link and a second link, the support part is provided to be closer to a center of the lower surface of the upper plate than is the link part, and the first link and the second link are provided close to one side with respect to the center of the lower surface of the upper plate.

The support part may be provided at the center of the lower surface of the upper plate.

The motor part may include a first motor configured to provide power to the first link and a second motor configured to provide power to the second link, and an operation of the first motor and an operation of the second motor may be controlled independently of each other.

The first link may include a support member fixedly coupled to the lower surface of the upper plate, a rotary body connected to a rotary shaft of the first motor and configured to rotate in an upward/downward direction along with a rotation of the rotary shaft of the first motor, and a first link member connected to the support member.

The first link may further include a second link member connected to the rotary body.

The first link may further include a third link member provided between the first link member and the second link member and connected to the first link member and the second link member.

The first link member and the support member may be connected to each other by means of universal joint coupling.

The second link member and the rotary body may be connected to each other by means of universal joint coupling.

The support part may include a first portion provided in a lower region of the support part and a second portion disposed at an upper side of the first portion, connected to the first portion, and fixedly coupled to the lower surface of the upper plate, and the first portion and the second portion may be connected to each other by means of universal-joint coupling.

The motor part may further include a third motor provided below the first portion and configured to provide power for rotating the first portion.

The first link and the second link may be identical to each other in such a manner that the first link and the second link are interchangeable with each other.

The first link member may include a first U portion coupled to the support member by means of the universal joint coupling and having a U-shaped cross section and a first protruding portion protruding from the first U portion toward the third link member and coupled to the third link member.

The second link member may include a second U portion coupled to the rotary body by means of the universal joint coupling and having a U-shaped cross section and a second protruding portion protruding from the second U portion toward the third link member and coupled to the third link member.

The third link member may include a first element fixedly coupled to the first protruding portion and a second element fixedly coupled to the second protruding portion, and the first element and the second element may be connected to each other by means of revolute-joint coupling.

The joint structure may further include a lower plate provided below the first motor and the second motor and configured to support the first motor and the second motor.

Another embodiment of the present disclosure provides a robot including a joint structure for a robot, in which the structure includes an upper plate provided in an upper region, a support part coupled to a lower surface of the upper plate and configured to support the upper plate, a link part coupled to the lower surface of the upper plate, and a motor part configured to provide power to the link part, and in which the link part comprises a first link and a second link, the support part is provided to be closer to a center of the lower surface of the upper plate than is the link part, and the first link and the second link are provided close to one side with respect to the center of the lower surface of the upper plate.

The structure may constitute a neck joint of the robot.

The structure may constitute a wrist joint of the robot.

According to embodiments of the present disclosure, it is possible to implement the new type of joint structure for a robot that has degrees of freedom even though being mounted with the motors that produce high outputs, thereby improving performance of the joint of the robot.

DETAILED DESCRIPTION OF ILLUSTRATIVE EMBODIMENTS

Hereinafter, a joint structure for a robot and a robot according to embodiments of the present disclosure will be described with reference to the drawings.

Joint Structure for Robot

Figure 1:
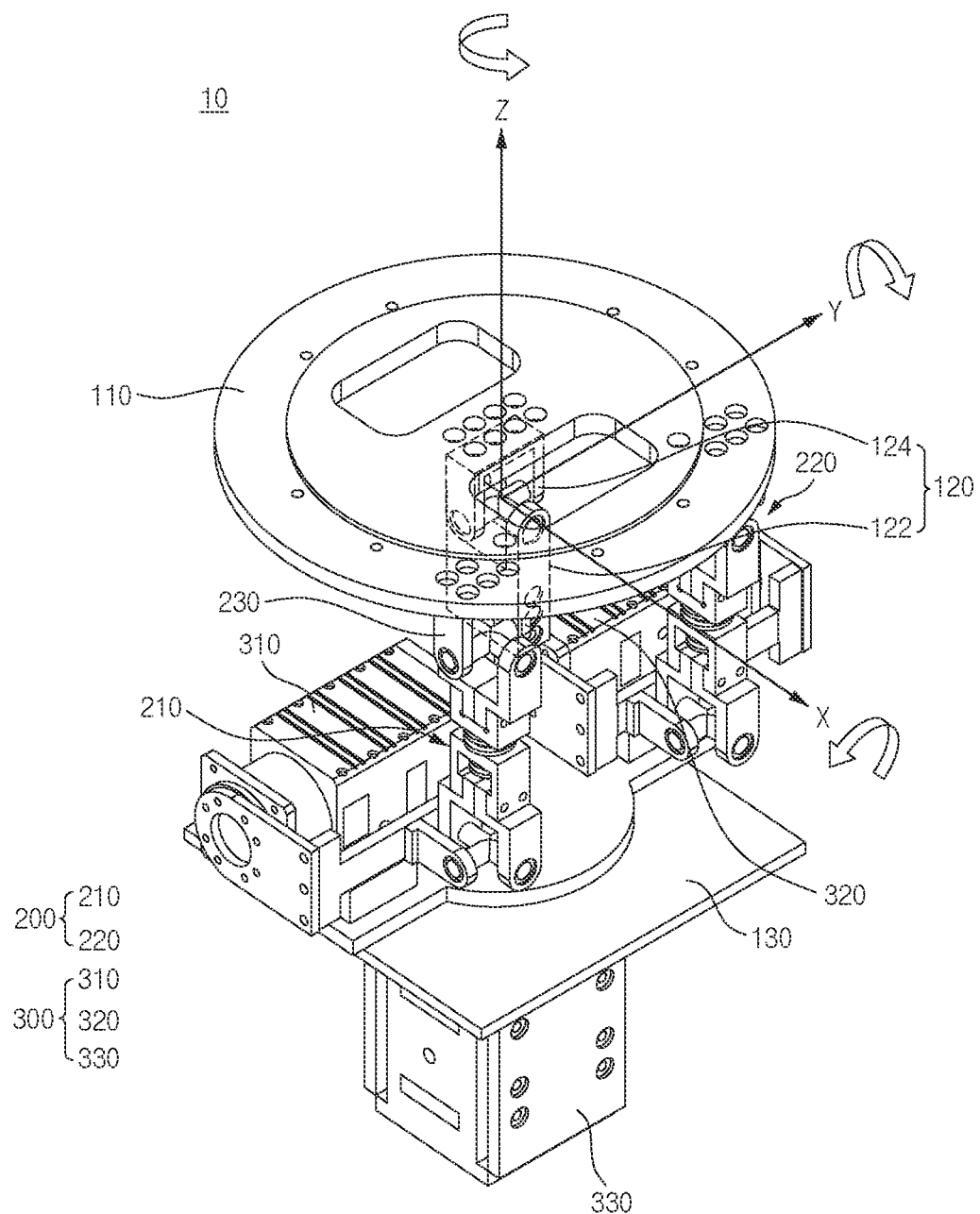
FIG. 1 is a perspective view illustrating a configuration of a joint structure for a robot according to embodiments of the present disclosure.
Figure 2:
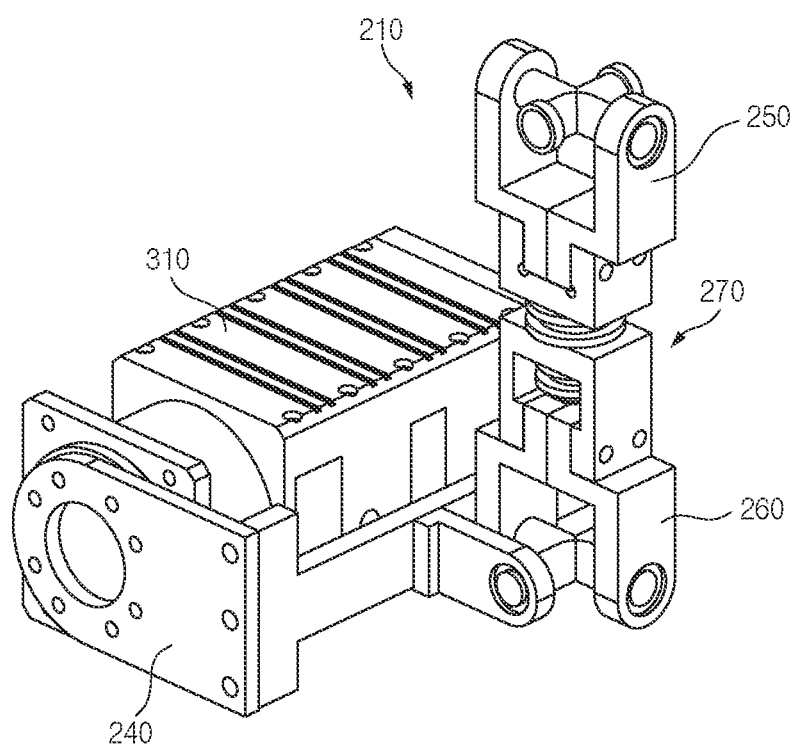
FIG. 2 is a perspective view illustrating a coupling configuration between a link and a motor provided in the joint structure for a robot according to embodiments of the present disclosure.

FIG. 1 is a perspective view illustrating a configuration of a joint structure for a robot according to embodiments of the present disclosure, and FIG. 2 is a perspective view illustrating a coupling configuration between a link and a motor provided in the joint structure for a robot according to embodiments of the present disclosure.

As illustrated in FIG. 1, a joint structure 10 for a robot (hereinafter, referred to as a 'structure') according to embodiments of the present disclosure may include an upper plate 110 provided in an upper region, a support part 120 coupled to a lower surface of the upper plate 110 and configured to support the upper plate 110, a link part 200 coupled to the lower surface of the upper plate 110, and a motor part 300 configured to provide power to the support part 120 and the link part 200. Meanwhile, FIG. 1 illustrates that the upper plate 110 has an approximately circular plate shape, but the shape of the upper plate 110 is not limited to that illustrated in FIG. 1, and the upper plate 110 may have various shapes.

Referring to FIG. 1, in a case in which an imaginary x-axis and an imaginary y-axis are provided in a horizontal direction and an imaginary z-axis is provided in a vertical direction, the upper plate 110 may rotate about the x-axis, the y-axis, and the z-axis by controlling the motions of the support part 120 and the link part 200. That is, the upper plate 110 of the structure 10 according to embodiments of the present disclosure may rotate about the three axes. Therefore, the structure 10 according to embodiments of the present disclosure may implement a motion of a joint (e.g., a neck joint or a wrist joint) by the rotational motion of the upper plate 110.

Continuing to refer to FIG. 1, the link part 200 may include a first link 210 and a second link 220. In addition, the motor part 300 may include a first motor 310 configured to provide power to the first link 210, and a second motor 320 configured to provide power to the second link 220. In this case, an operation of the first motor 310 and an operation of the second motor 320 may be controlled independently of each other.

Meanwhile, according to embodiments of the present disclosure, the support part 120 may be provided to be closer to a center of the lower surface of the upper plate 110 than is the link part 200. More particularly, the support part 120 may be provided at the center of the lower surface of the upper plate 110. In this case, the support part 120 may stably support the upper plate 110, thereby ensuring structural stability of the structure 10.

In contrast, according to embodiments of the present disclosure, the first link 210 and the second link 220 may be provided close to one side with respect to the center of the lower surface of the upper plate 110. In this case, it may be understood that the first link 210 and the second link 220 are not provided at one side and the other side of the support part 120, respectively, but both the first link 210 and the second link 220 are provided at one side of the support part 120. For example, when the upper plate 110 is divided into imaginary quadrants when the structure 10 is viewed from above, the first link 210 and the second link 220 may be positioned in any one of the quadrants. As an example, FIG. 1 illustrates a state in which the first link 210 and the second link 220 are provided close to a right lower region with respect to the center of the lower surface of the upper plate 110.

In the case in which the first link 210 and the second link 220 are provided close to one side with respect to the center of the lower surface of the upper plate 110 as described above, both the first motor 310 and the second motor 320 need to operate to allow the upper plate 110 to rotate about the x-axis or rotate about the y-axis, as described below. According to embodiments of the present disclosure, even though a motor, which produces a low output, is mounted as the first motor 310 and the second motor 320, the upper plate 110 may be rotated about the x-axis and the y-axis, such that a size of the motor mounted on the structure 10 may be reduced. To this end, according to embodiments of the present disclosure, the first motor 310 and the second motor 320 may be controlled so that a rotation direction of a rotary shaft provided on the first motor 310 and a rotation direction of a rotary shaft provided on the second motor 320 are equal to each other. In addition, according to embodiments of the present disclosure, the first motor 310 and the second motor 320 may be controlled so that a rotation direction of the rotary shaft provided on the first motor 310 and a rotation direction of the rotary shaft provided on the second motor 320 are opposite to each other.

More particularly, according to embodiments of the present disclosure, a distance between the support part 120 and the first link 210 may be equal to a distance between the support part 120 and the second link 220. In addition, according to embodiments of the present disclosure, an angle ∠ABC defined by the first link 210 (A), the support part 120 (B), and the second link 220 (C) may be 10 degrees or more and 170 degrees or less. More particularly, the angle ∠ABC may be 60 degrees or more and 140 degrees or less.

Meanwhile, according to embodiments of the present disclosure, the first link 210 and the second link 220 are identical to each other in such a manner that the first link 210 and the second link 220 are interchangeable with each other. In this case, the first link 210 and the second link 220 need not be separately manufactured, and as a result, productivity of the structure 10 may be improved. Hereinafter, the description will be made focusing on a configuration of the first link 210. As described above, since the first link 210 and the second link 220 may be identical to each other in such a manner that the first link 210 and the second link 220 are interchangeable with each other, the details and configuration of the first link 210, which will be described below, may also be equally applied to the second link 220.

Referring to FIGS. 1 and 2, the first link 210 may include a support member 230 fixedly coupled to the lower surface of the upper plate 110, a rotary body 240 coupled to the rotary shaft of the first motor 310 and configured to rotate in an upward/downward direction along with the rotation of the rotary shaft of the first motor 310, a first link member 250 connected to the support member 230, a second link member 260 connected to the rotary body 240, and a third link member 270 provided between the first link member 250 and the second link member 260 and connected to the first link member 250 and the second link member 260. Therefore, according to embodiments of the present disclosure, when the first motor 310 operates, the rotary body 240 rotates in the upward/downward direction, such that the first link member 250, the second link member 260, and the third link member 270 may also move in the upward/downward direction.

Meanwhile, referring to FIGS. 1 and 2, the first link member 250 and the support member 230 may be connected to each other by means of universal joint coupling, and the second link member 260 and the rotary body 240 may also be connected to each other by means of universal joint coupling. For example, a cross shaft may be provided in a region in which the first link member 250 and the support member 230 are connected to each other, and the cross shaft is inserted and coupled into the first link member 250 and the support member 230, such that the universal joint coupling may be implemented. Similarly, a cross shaft may also be provided in a region in which the second link member 260 and the rotary body 240 are connected to each other, and the cross shaft is inserted and coupled into the second link member 260 and the rotary body 240, such that the universal joint coupling may be implemented.

The universal joint coupling may be provided to enable a free relative rotation between the first link member 250 and the support member 230 and a free relative rotation between the second link member 260 and the rotary body 240. A coupling method using a rod end bearing may be considered instead of the universal joint coupling using the cross shaft. However, the coupling method using the rod end bearing may not be advantageous in terms of efficiency of power transmission, noise, and vibration because there may be a gap formed between the first link member 250 and the support member 230 and between the second link member 260 and the rotary body 240 during the use of the structure. Therefore, according to embodiments of the present disclosure, the universal joint coupling may be applied in order to prevent a problem caused by the formation of the gap between the first link member 250 and the support member 230 and between the second link member 260 and the rotary body 240.

Hereinafter, the details of the first to third link members will be described in detail with reference to the drawings.

Figure 3:
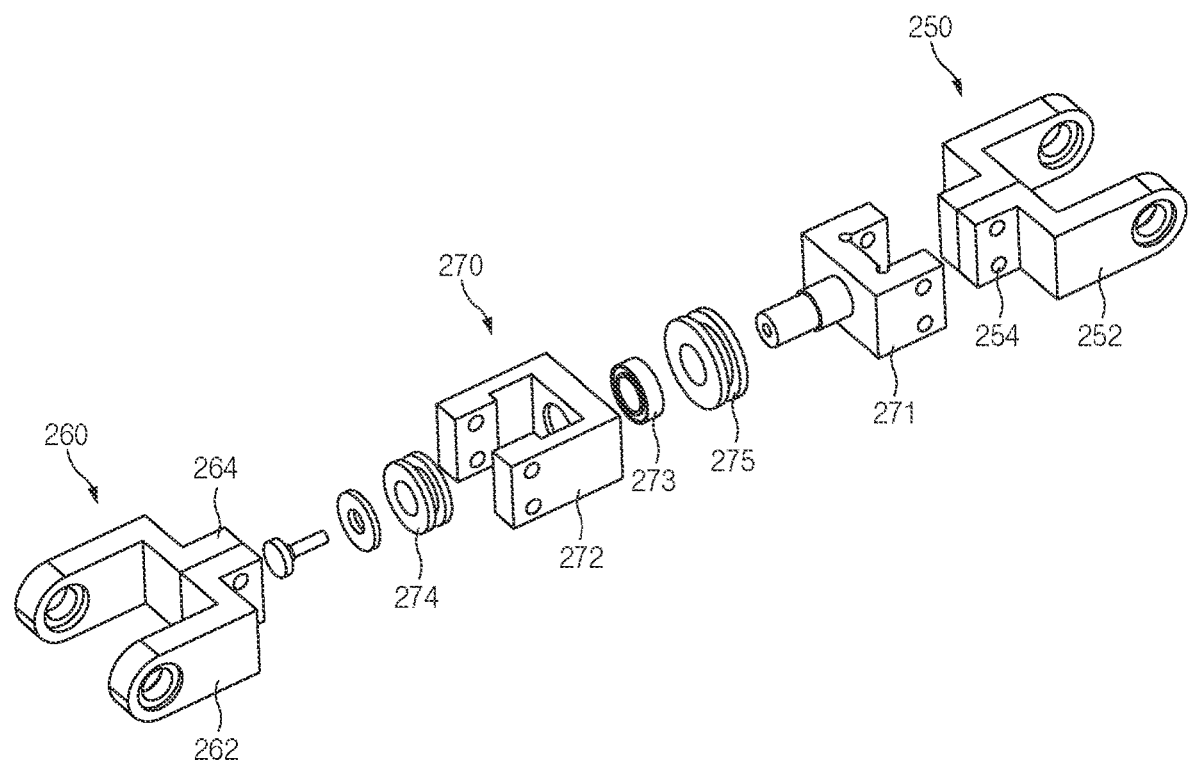
FIG. 3 is an exploded perspective view illustrating a configuration of a link provided in the joint structure for a robot according to embodiments of the present disclosure.
Figure 4:
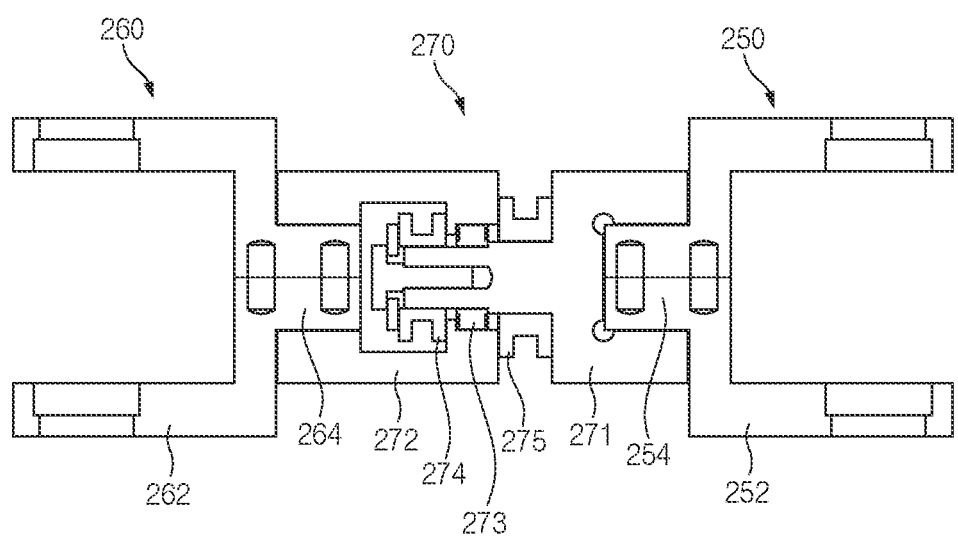
FIG. 4 is a cross-sectional view illustrating a configuration of the link provided in the joint structure for a robot according to embodiments of the present disclosure.

FIG. 3 is an exploded perspective view illustrating a configuration of a link provided in a joint structure for a robot according to embodiments of the present disclosure, and FIG. 4 is a cross-sectional view illustrating a configuration of the link provided in the joint structure for a robot according to embodiments of the present disclosure.

As illustrated in FIGS. 3 and 4, the first link member 250 may include a first U portion 252 coupled to the support member 230 (see FIG. 1) by means of universal joint coupling and having a U-shaped cross section, and a first protruding portion 254 protruding from the first U portion 252 toward the third link member 270 and coupled to the third link member 270. In addition, the second link member 260 may include a second U portion 262 coupled to the rotary body 240 (see FIG. 2) by means of universal-joint coupling and having a U-shaped cross section, and a second protruding portion 264 protruding from the second U portion 262 toward the third link member 270 and coupled to the third link member 270. More particularly, the first link member 250 and the second link member 260 are identical to each other in such a manner that the first link member 250 and the second link member 260 are interchangeable with each other.

Meanwhile, the third link member 270 may include a first element 271 fixedly coupled to the first protruding portion 254, and a second element 272 fixedly coupled to the second protruding portion 264. In this case, according to embodiments of the present disclosure, the first element 271 and the second element 272 are coupled to each other by means of revolute-joint coupling. The configuration in which the first element 271 and the second element 272 are coupled to each other by means of the revolute-joint coupling may be provided to remove torsional force that may be applied to the first link 210 during a process in which the first link 210 rotates in the upward/downward direction as the rotary body 240 is rotated by the operation of the first motor 310. More particularly, a part of the second element 272 may be provided to be penetrated by the first element 271. In this case, the third link member 270 may include a radial bearing 273 provided between the first element 271 and the second element 272 in a region in which the first element 271 penetrates the second element 272 and a first thrust bearing 274 and a second thrust bearing 275 provided at both sides of the radial bearing 273. Therefore, the relative rotational motion in the first link 210 for removing the torsional force may be performed between the first element 271 and the second element 272.

Continuing to refer to FIGS. 1 and 2, the support part 120 of the structure 10 according to embodiments of the present disclosure may include a first portion 122 provided in a lower region of the support part 120, and a second portion 124 disposed at an upper side of the first portion 122, connected to the first portion 122, and fixedly coupled to the lower surface of the upper plate 110. In this case, according to embodiments of the present disclosure, the first portion 122 and the second portion 124 may be connected to each other by means of universal-joint coupling. In more detail, a cross shaft may be provided in a region in which the first portion 122 and the second portion 124 are connected to each other, and the cross shaft may be inserted and coupled into the first portion 122 and the second portion 124, such that the universal joint coupling may be implemented.

In addition, as illustrated in FIG. 1, the motor part 300 of the structure 10 according to embodiments of the present disclosure may further include a third motor 330 provided below the first portion 122 of the support part 120 and configured to provide power for rotating the first portion 122 about the z-axis. The operation of the third motor 330 and the operations of the first motor 310 and the second motor 320 may be controlled independently of each other. More particularly, the first portion 122 may be connected directly to the third motor 330.

Continuing to refer to FIG. 1, the structure 10 according to embodiments of the present disclosure may further include a lower plate 130 provided below the first motor 310 and the second motor 320 and configured to support the first motor 310 and the second motor 320. In more detail, the lower plate 130 may be provided above the third motor 330, and the first portion 122 of the support part 120 may be provided to penetrate the lower plate 130.

Meanwhile, as illustrated in FIG. 1, according to embodiments of the present disclosure, a direction in which the first link 210 and the second link 220 are arranged and a direction in which the first motor 310 and the second motor 320 are arranged may be parallel to each other.

Figure 5:
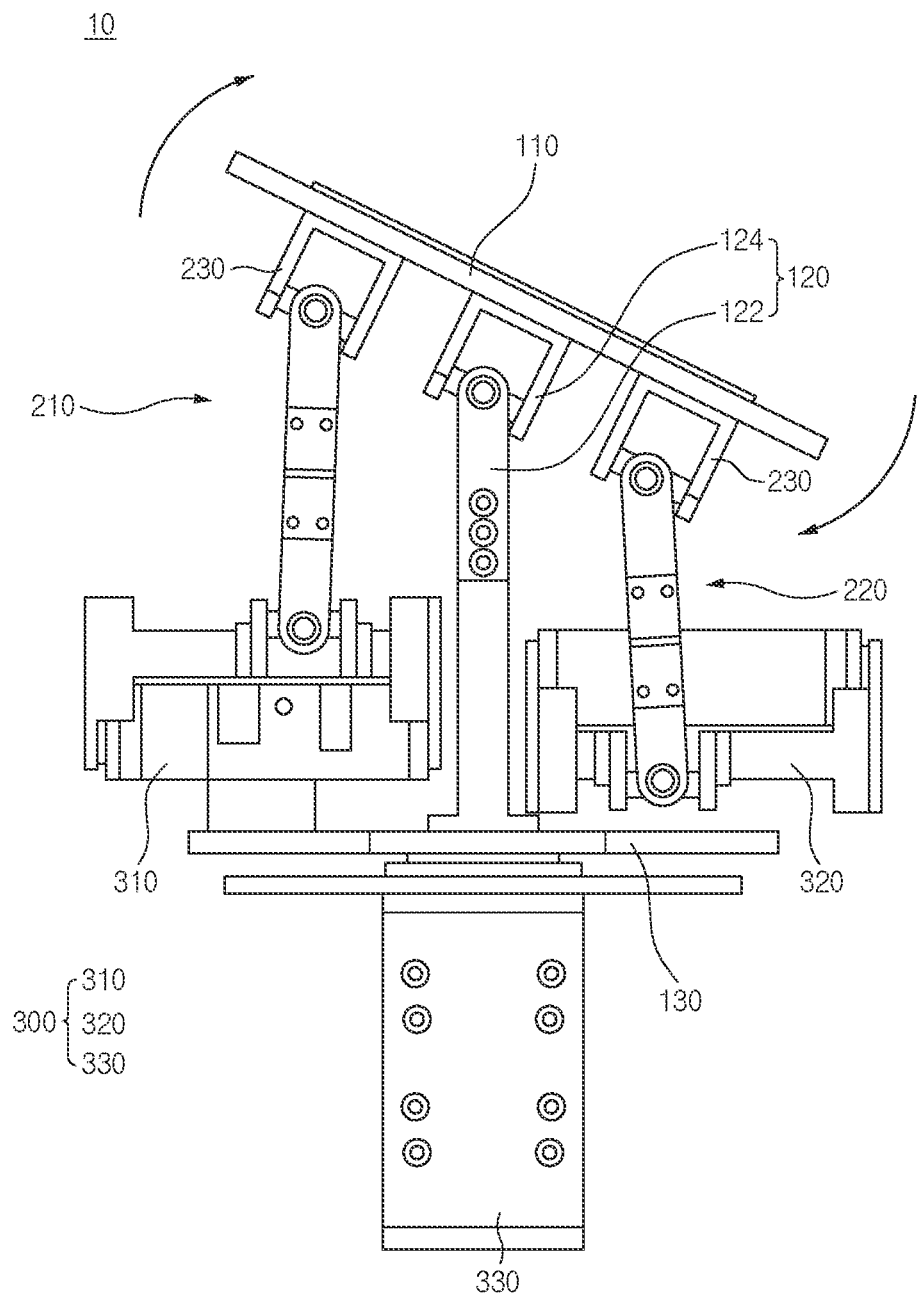
FIG. 5 is a side view illustrating a state in which the joint structure for a robot according to embodiments of the present disclosure rotates about an x-axis.
Figure 6:
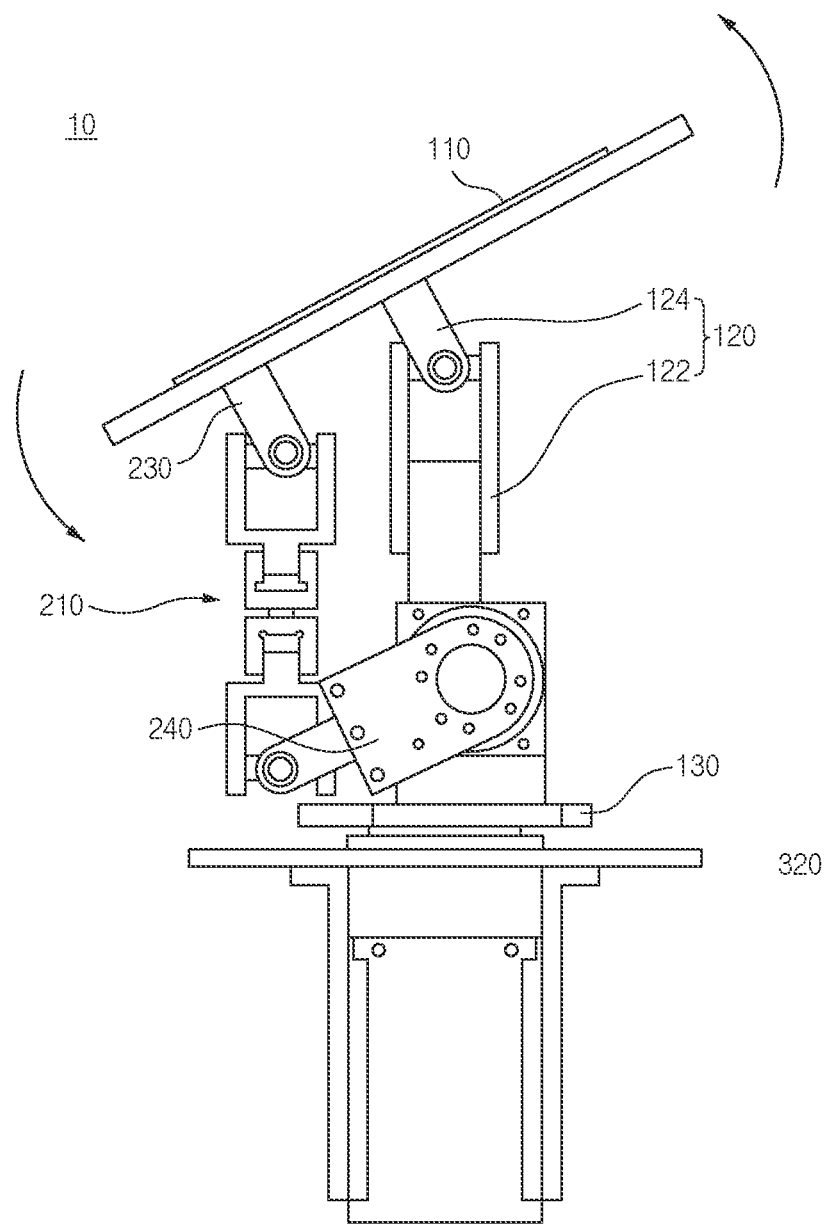
FIG. 6 is a side view illustrating a state in which the joint structure for a robot according to embodiments of the present disclosure rotates about a y-axis.
Figure 7:
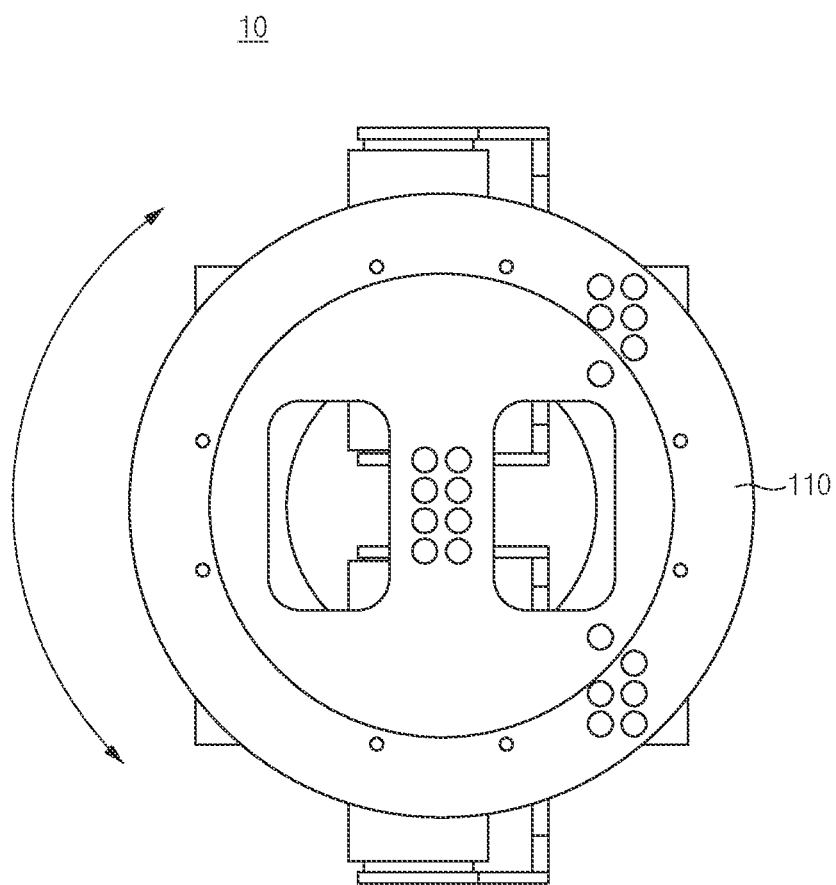
FIG. 7 is a side view illustrating a state in which the joint structure for a robot according to embodiments of the present disclosure rotates about a z-axis.

FIG. 5 is a side view illustrating a state in which the joint structure for a robot according to embodiments of the present disclosure rotates about the x-axis, and FIG. 6 is a side view illustrating a state in which the joint structure for a robot according to embodiments of the present disclosure rotates about the y-axis. In addition, FIG. 7 is a side view illustrating a state in which the joint structure for a robot according to embodiments of the present disclosure rotates about the z-axis.

Referring to FIGS. 1, 5, 6, and 7, the operation of the structure 10 according to embodiments of the present disclosure will be described below.

According to embodiments of the present disclosure, the first motor 310 and the second motor 320 operate to allow the upper plate 110, which is provided in the structure 10, to rotate about the x-axis. In this case, the rotary shaft of the first motor 310 and the rotary shaft of the second motor 320 rotate in opposite directions. Therefore, the first link 210 and the second link 220 also move in opposite directions. For example, the second link 220 moves downward while the first link 210 moves upward in order to rotate the upper plate 110 about the x-axis, as illustrated in FIG. 5. Alternatively, the second link 220 moves upward while the first link 210 moves downward in order to rotate the upper plate 110 about the x-axis.

In this case, as the upper plate 110 rotates about the x-axis, the upper plate 110 is inclined in one direction, and the support member 230 is also inclined in one direction together with the upper plate 110 because the support member 230 is fixedly coupled to the lower surface of the upper plate 110 as described above. In contrast, since the support member 230 and the first link member 250 are connected to each other by means of the universal joint coupling as described above, the first to third link members 250, 260, and 270 are not inclined in one direction but may extend in the upward/downward direction.

Meanwhile, according to embodiments of the present disclosure, the first motor 310 and the second motor 320 operate to allow the upper plate 110, which is provided in the structure 10, to rotate about the y-axis. In this case, the rotary shaft of the first motor 310 and the rotary shaft of the second motor 320 rotate in the same direction. Therefore, the first link 210 and the second link 220 also move in the same direction. For example, the second link 220 also moves downward while the first link 210 moves downward in order to rotate the upper plate no about the y-axis, as illustrated in FIG. 6. Alternatively, the second link 220 also moves upward while the first link 210 moves upward in order to rotate the upper plate 110 about the y-axis.

In this case, as the upper plate 110 rotates about the y-axis, the upper plate 110 is inclined in one direction, and the support member 230 is also inclined in one direction together with the upper plate 110 because the support member 230 is fixedly coupled to the lower surface of the upper plate 110 as described above. In contrast, since the support member 230 and the first link member 250 are connected to each other by means of the universal joint coupling as described above, the first to third link members 250, 260, and 270 are not inclined in one direction but may extend in the upward/downward direction.

Lastly, according to embodiments of the present disclosure, the third motor 330 operates to allow the upper plate 110, which is provided in the structure 10, to rotate about the z-axis. Therefore, the support part 120 connected to the third motor 330 rotates about the z-axis, and the upper plate 110 connected to the support part 120 also rotates about the z-axis.

Robot

A robot according to embodiments of the present disclosure may include the joint structure. In more detail, the robot according to embodiments of the present disclosure may be a robot for providing a service and may include the structure 10 for implementing a motion of a neck joint and/or a wrist joint.

In this case, according to embodiments of the present disclosure, the structure 10 may include the upper plate 110 provided in the upper region, the support part 120 coupled to the lower surface of the upper plate 110 and configured to support the upper plate 110, the link part 200 coupled to the lower surface of the upper plate 110, and the motor part 300 configured to provide power to the link part 200. In this case, the link part 200 may include the first link 210 and the second link 220. The support part 120 may be provided to be closer to the center of the lower surface of the upper plate 110 than is the link part 200. In addition, the first link 210 and the second link 220 may be provided close to one side with respect to the center of the lower surface of the upper plate 110.

Meanwhile, referring to FIG. 1, the structure 10 according to embodiments of the present disclosure may constitute a neck joint of a robot. Therefore, the structure 10 according to embodiments of the present disclosure may implement a motion of the neck joint of the robot.

Figure 8:
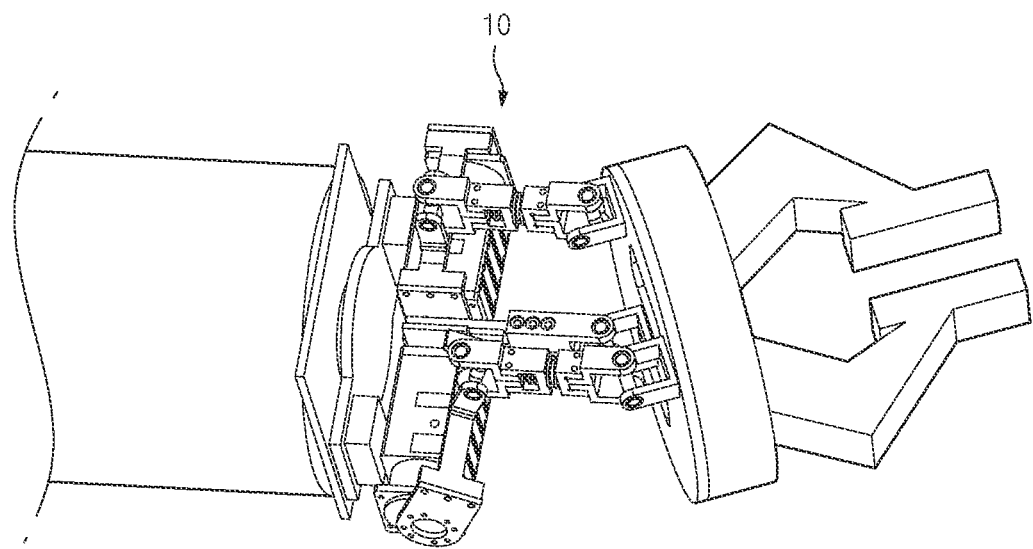
FIG. 8 is a perspective view illustrating a state in which the joint structure for a robot according to embodiments of the present disclosure is applied to an arm joint of a robot.

FIG. 8 is a perspective view illustrating a state in which the joint structure for a robot according to embodiments of the present disclosure is applied to an arm joint of a robot.

Otherwise, as illustrated in FIG. 8, the structure 10 according to embodiments of the present disclosure may constitute a wrist joint of a robot. Therefore, the structure 10 according to embodiments of the present disclosure may implement a motion of the wrist joint of the robot.

The present disclosure has been described with reference to the limited exemplary embodiments and the drawings, but the present disclosure is not limited thereto. The described exemplary embodiments may be carried out in various forms by those skilled in the art to which the present disclosure pertains within the technical spirit of the present disclosure and within the scope equivalent to the appended claims.

What is claimed is:

1. A joint structure for a robot, the joint structure comprising:
an upper plate provided in an upper region;
a link part coupled to a lower surface of the upper plate, wherein the link part comprises a first link and a second link and wherein the first link and the second link are provided close to one side of the upper plate with respect to a center of the lower surface of the upper plate;
a support part coupled to the lower surface of the upper plate and configured to support the upper plate, wherein the support part is provided to be closer to the center of the lower surface of the upper plate than is the link part, wherein a distance between the support part and the first link is equal to a distance between the support part and the second link; and
a motor part configured to provide power to the support part and the link part,
wherein the motor part comprises:
 a first motor configured to provide power to the first link; and
 a second motor configured to provide power to the second link;
wherein the first link comprises:
 a support member fixedly coupled to the lower surface of the upper plate;
 a rotary body connected to a rotary shaft of the first motor and configured to rotate in an upward/downward direction along with a rotation of the rotary shaft of the first motor;
 a first link member connected to the support member by a universal-joint coupling;
 a second link member connected to the rotary body;
 a third link member provided between the first link member and the second link member and connected to the first link member and the second link member;
wherein the first link member comprises:
 a first U portion coupled to the support member by the universal-joint coupling and having a U-shaped cross section; and
 a first protruding portion protruding from the first U portion toward the third link member and coupled to the third link member,
wherein the second link member comprises:
 a second U portion coupled to the rotary body by a universal-joint coupling and having a U-shaped cross section; and
 a second protruding portion protruding from the second U portion toward the third link member and coupled to the third link member,
wherein the third link member comprises:
 a first element fixedly coupled to the first protruding portion; and
 a second element fixedly coupled to the second protruding portion, wherein the first element and the second element are connected to each other by a revolute-joint coupling.

2. The joint structure of claim 1, wherein the support part is provided at the center of the lower surface of the upper plate.

3. The joint structure of claim 1, further comprising a lower plate provided below the first motor and the second motor and configured to support the first motor and the second motor.

4. The joint structure of claim 1, wherein the support part comprises:
a first portion provided in a lower region of the support part; and
a second portion disposed at an upper side of the first portion, connected to the first portion, and fixedly coupled to the lower surface of the upper plate, wherein the first portion and the second portion are connected to each other by a universal joint coupling.

5. The joint structure of claim 4, wherein the motor part further comprises a third motor provided below the second portion and configured to provide power for rotating the second portion.

6. The joint structure of claim 1, wherein the first link and the second link are identical in structure such that the first link and the second link are interchangeable with each other.

7. The joint structure of claim 1, wherein the link part includes only the first link and the second link.

8. The joint structure of claim 7, wherein the upper plate has a circular shape, and wherein an angle at the support part between the first link and the second link is between 10° and 170°.

9. The joint structure of claim 7, wherein the upper plate has a circular shape, and wherein an angle at the support part between the first link and the second link is between 60° and 140°.

10. A joint structure for a robot, the joint structure comprising:
an upper plate provided in an upper region;
a link part coupled to a lower surface of the upper plate, wherein the link part comprises a first link and a second link, and wherein the first link and the second link are provided close to one side of the upper plate with respect to a center of the lower surface of the upper plate;
a support part coupled to the center of the lower surface of the upper plate and configured to support the upper plate; and
a motor part configured to provide power to the support part and the link part, wherein the motor part comprises:
 a first motor configured to provide power to the first link; and
 a second motor configured to provide power to the second link;
wherein an operation of the first motor and an operation of the second motor are configured to be controlled independently of each other;
wherein the first link comprises:
 a support member fixedly coupled to the lower surface of the upper plate;
 a rotary body connected to a rotary shaft of the first motor and configured to rotate in an upward/downward direction along with a rotation of the rotary shaft of the first motor;
 a first link member connected to the support member by a universal joint coupling;
 a second link member connected to the rotary body;
 a third link member provided between the first link member and the second link member and connected to the first link member and the second link member;
 a first U portion coupled to the support member by the universal-joint coupling and having a U-shaped cross section; and
 a first protruding portion protruding from the first U portion toward the third link member and coupled to the third link member;
wherein the second link member comprises:
 a second U portion coupled to the rotary body by a universal joint coupling and having a U-shaped cross section; and
 a second protruding portion protruding from the second U portion toward the third link member and coupled to the third link member; and
wherein the third link member comprises:

a first element fixedly coupled to the first protruding portion; and a second element fixedly coupled to the second protruding portion, wherein the first element and the second element are connected to each other by a revolute-joint coupling.

11. A robot comprising:

a robot arm;

an end effector; and a joint structure coupled between the robot arm and the end effector, wherein the joint structure comprises:

an upper plate provided in an upper region;

a support part coupled to a lower surface of the upper plate and configured to support the upper plate;

a link part coupled to the lower surface of the upper plate; and a motor part configured to provide power to the link part;

wherein the link part comprises a first link and a second link, wherein the motor part comprises:

a first motor configured to provide power to the first link; and a second motor configured to provide power to the second link;

wherein the first link comprises:

a support member fixedly coupled to the lower surface of the upper plate;

a rotary body connected to a rotary shaft of the first motor and configured to rotate in an upward/downward direction along with a rotation of the rotary shaft of the first motor;

a first link member connected to the support member by a universal-joint coupling;

a second link member connected to the rotary body;

a third link member provided between the first link member and the second link member and connected to the first link member and the second link member;

wherein the first link member comprises:

a first U portion coupled to the support member by the universal-joint coupling and having a U-shaped cross section; and a first protruding portion protruding from the first U portion toward the third link member and coupled to the third link member, wherein the second link member comprises:

a second U portion coupled to the rotary body by a universal-joint coupling and having a U-shaped cross section; and a second protruding portion protruding from the second U portion toward the third link member and coupled to the third link member, wherein the third link member comprises:

a first element fixedly coupled to the first protruding portion; and a second element fixedly coupled to the second protruding portion, wherein the first element and the second element are connected to each other by a revolute-joint coupling;

wherein the support part is closer to a center of the lower surface of the upper plate than is the link part;

wherein the first link and the second link are provided close to one side of the upper plate with respect to the center of the lower surface of the upper plate; and wherein a distance between the support part and the first link is equal to a distance between the support part and the second link.

12. The robot of claim 11, wherein the joint structure constitutes a wrist joint of the robot.

13. The robot of claim 11, further comprising a lower plate provided below the first motor and the second motor and configured to support the first motor and the second motor.

* * * * *